(12) United States Patent
Amaya et al.

(10) Patent No.: US 10,576,684 B2
(45) Date of Patent: Mar. 3, 2020

(54) THREE-DIMENSIONAL SHAPING METHOD

(71) Applicant: Matsuura Machinery Corporation, Fukui, Fukui (JP)

(72) Inventors: Kouichi Amaya, Fukui (JP); Kousuke Ishimoto, Fukui (JP); Takeshi Yamada, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 351 days.

(21) Appl. No.: 15/667,198

(22) Filed: Aug. 2, 2017

(65) Prior Publication Data

US 2019/0039287 A1 Feb. 7, 2019

(51) Int. Cl.
| | |
|---|---|
| *B29C 64/153* | (2017.01) |
| *B33Y 10/00* | (2015.01) |
| *B33Y 70/00* | (2020.01) |
| *B23K 15/00* | (2006.01) |
| *B23K 15/02* | (2006.01) |

(Continued)

(52) U.S. Cl.
CPC ........ *B29C 64/153* (2017.08); *B23K 15/0086* (2013.01); *B23K 15/02* (2013.01); *B23K 26/032* (2013.01); *B23K 26/144* (2015.10); *B23K 26/342* (2015.10); *B29C 64/393* (2017.08); *B33Y 10/00* (2014.12); *B33Y 50/02* (2014.12); *B33Y 70/00* (2014.12); *B22F 3/105* (2013.01); *B22F 3/1055* (2013.01); *B22F 2003/1056* (2013.01); *B22F 2003/1057* (2013.01); *B29C 64/188* (2017.08); *B29C 64/386* (2017.08); *G01J 3/30* (2013.01)

(58) Field of Classification Search
CPC ... B29C 64/153; B29C 64/386; B29C 64/393; B29C 64/188; B33Y 10/00; B33Y 50/02; B23K 26/144; B23K 26/342; B23K 26/032; B23K 26/0086; G01J 3/30; B22F 3/105; B22F 3/1055; B22F 2003/1056; B22F 2003/1057
USPC ........................................................ 264/40.6
See application file for complete search history.

(56) References Cited

U.S. PATENT DOCUMENTS

| | | | |
|---|---|---|---|
| 2004/0026807 A1* | 2/2004 | Andersson | B22F 3/004 264/40.1 |
| 2013/0343947 A1* | 12/2013 | Satzger | B22F 3/1055 419/55 |

FOREIGN PATENT DOCUMENTS

| | | |
|---|---|---|
| JP | 2003-247943 A | 9/2003 |
| JP | 2004-093300 A | 3/2004 |

(Continued)

*Primary Examiner* — Joseph S Del Sole
*Assistant Examiner* — Lawrence D. Hohenbrink, Jr.
(74) *Attorney, Agent, or Firm* — Richard M. Goldberg

(57) ABSTRACT

A three-dimensional shaping method utilizing a powder layer forming step, and a sintering step with a laser beam or electron beam, the method including the steps of a) measuring the reflection intensity of the beam irradiated in each sintering step, or the reflection intensity of other light, b) commanding to continue sintering within the next time unit, or when the next powder layer forming step is given, when it has been detected that the reflection intensity of the step a) is within a standard range for a given time unit, and, c) judging that a sintering defect has been produced, and commanding to cancel sintering in the next time unit, or when the next powder layer forming step is given, when it is detected that a condition has occurred in which the reflection intensity of step a) deviates from the standard range for a given time unit.

16 Claims, 6 Drawing Sheets

(51) Int. Cl.
  *B23K 26/03*    (2006.01)
  *B23K 26/144*   (2014.01)
  *B23K 26/342*   (2014.01)
  *B29C 64/393*   (2017.01)
  *B33Y 50/02*    (2015.01)
  *B29C 64/386*       (2017.01)
  *B29C 64/188*       (2017.01)
  *G01J 3/30*         (2006.01)
  *B22F 3/105*        (2006.01)

(56) References Cited

FOREIGN PATENT DOCUMENTS

JP   2008-241658 A   10/2008
JP   2010-243375 A   10/2010
JP   2013-083493 A    5/2013

\* cited by examiner

[Fig. 1]
(a)
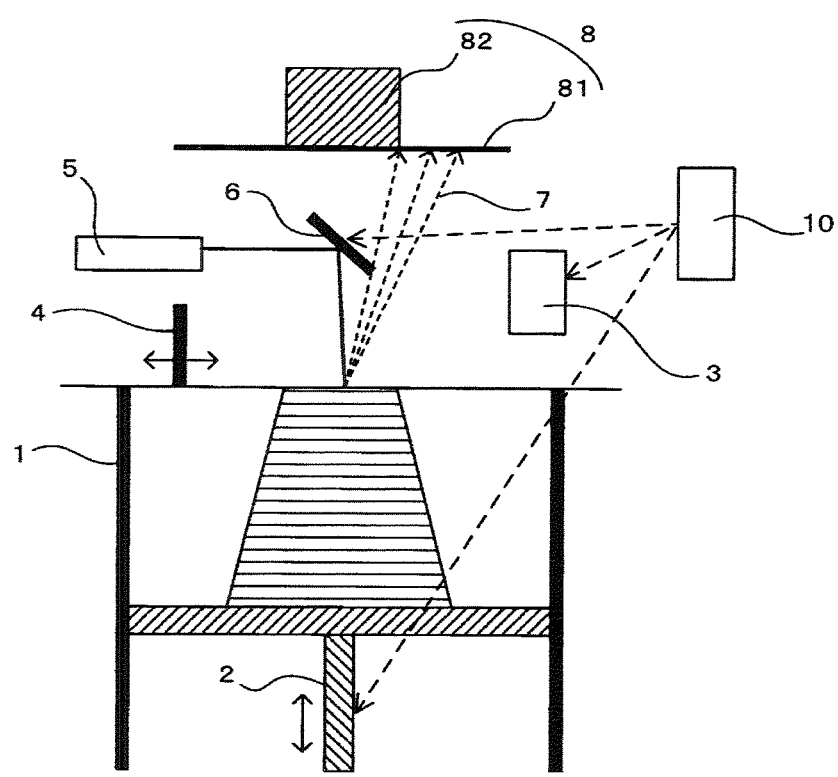
(b)
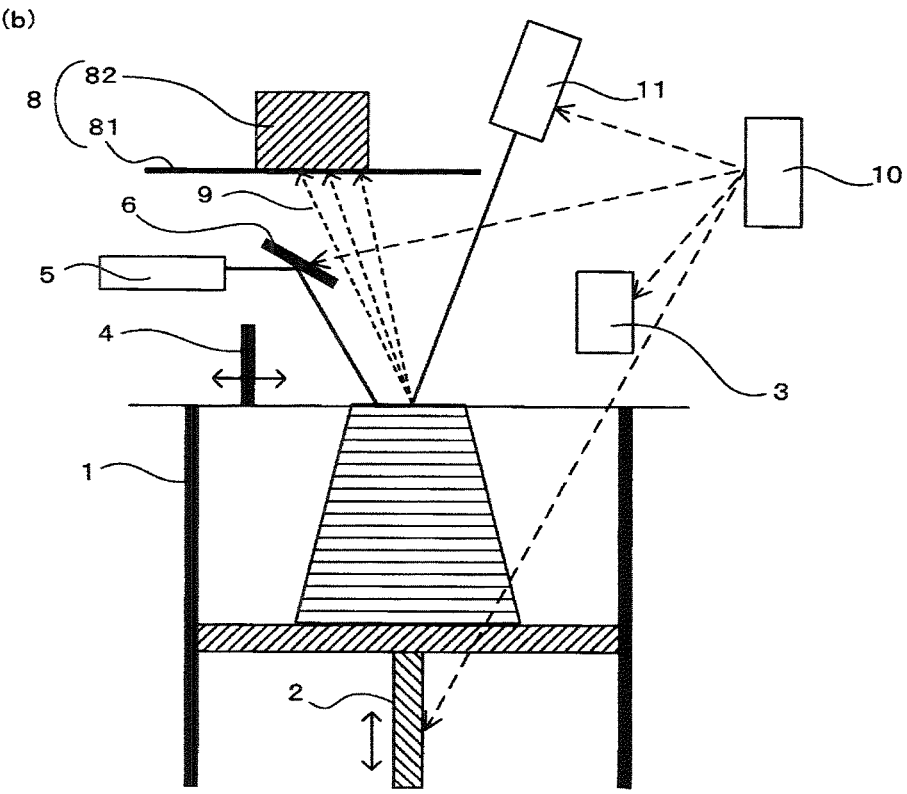

[Fig. 2]
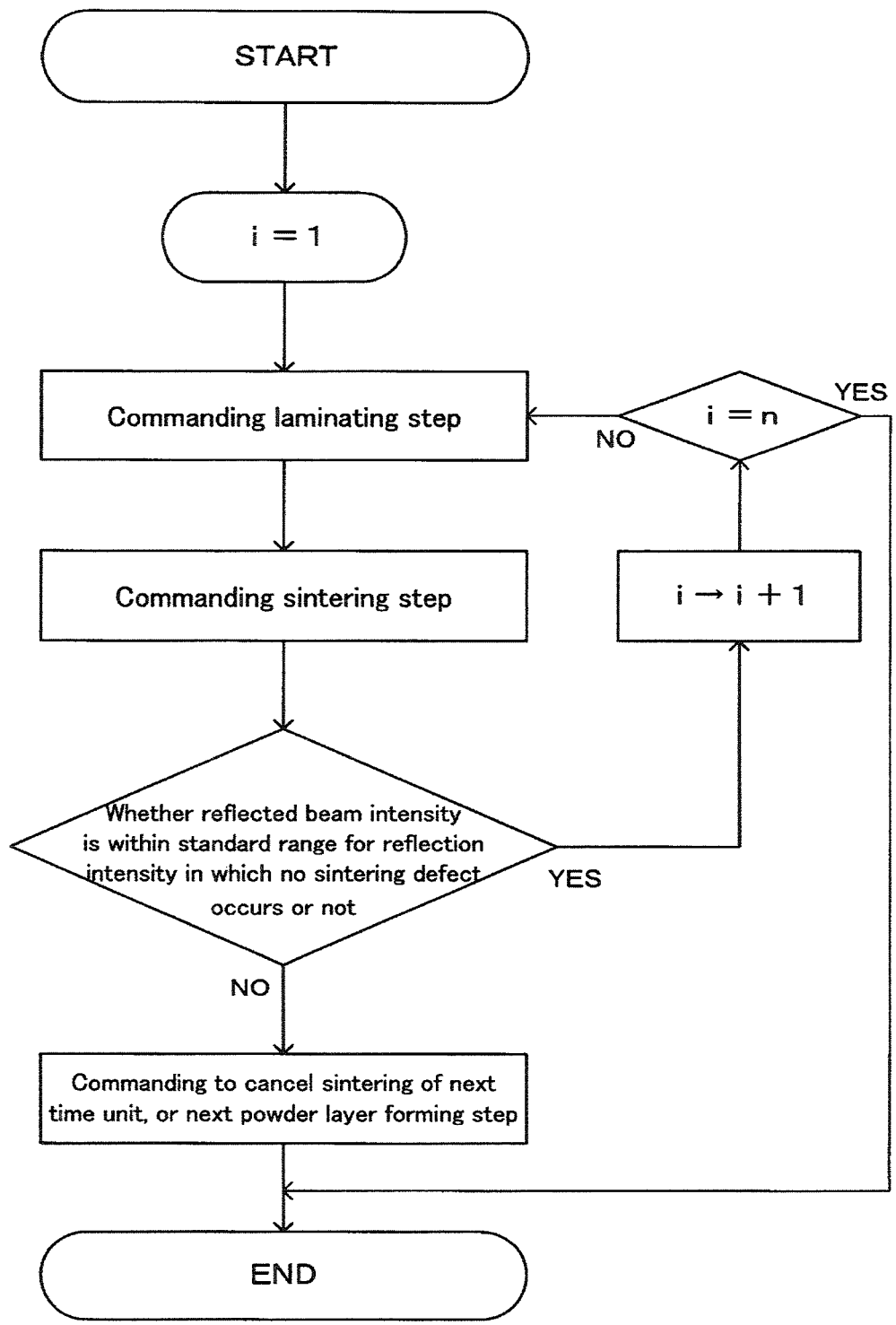

[Fig. 3]
(a)
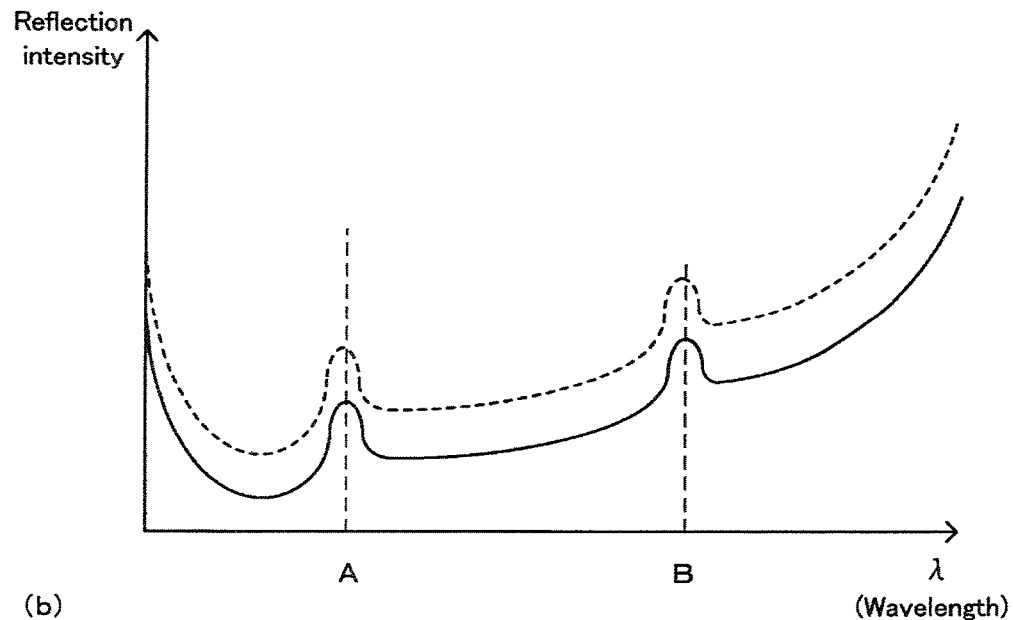
(b)
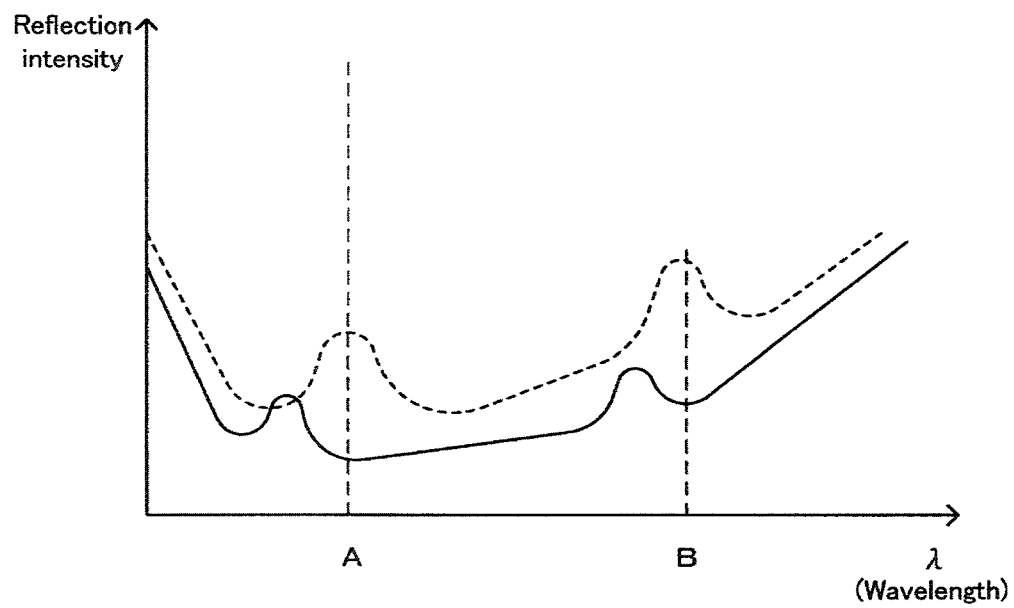

[Fig. 4]
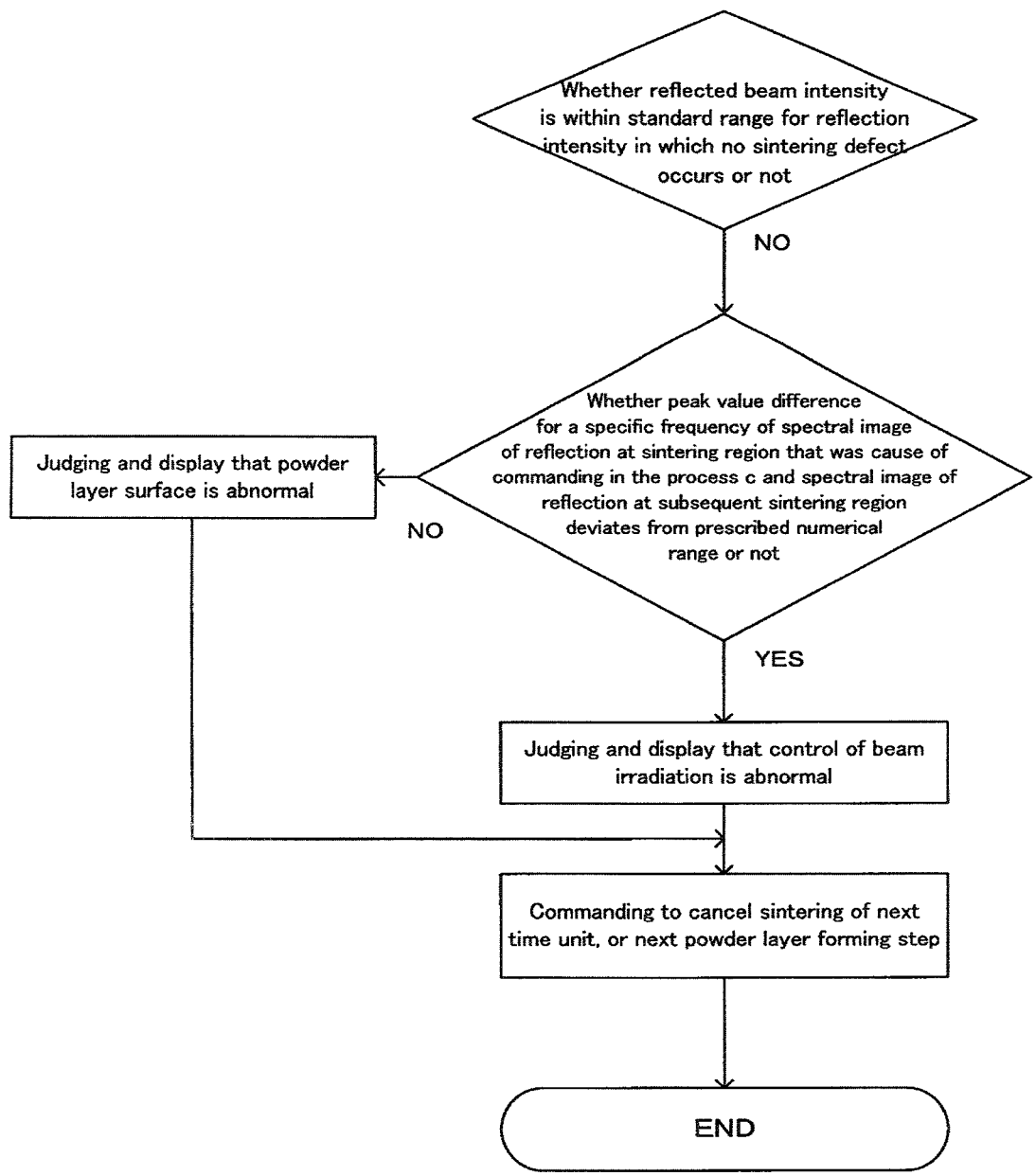

[Fig. 5]
(a)
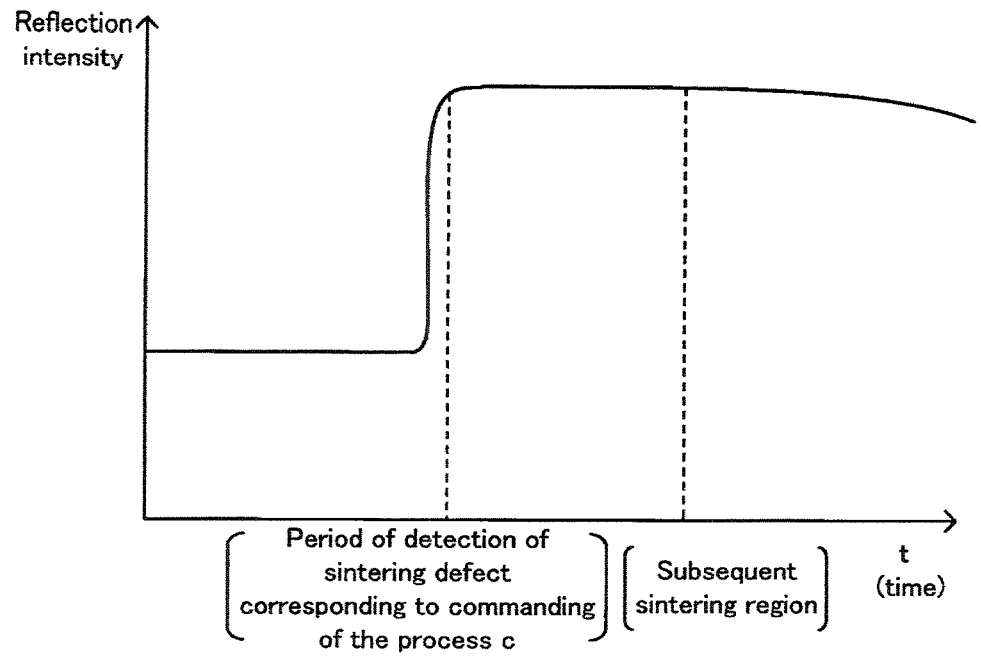
(b)
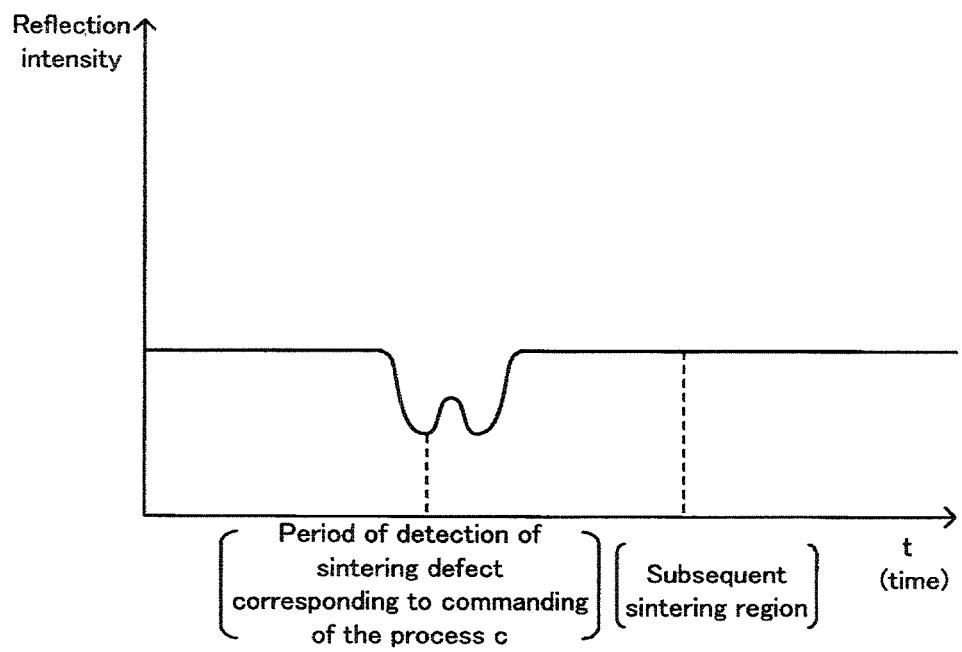

[Fig. 6]
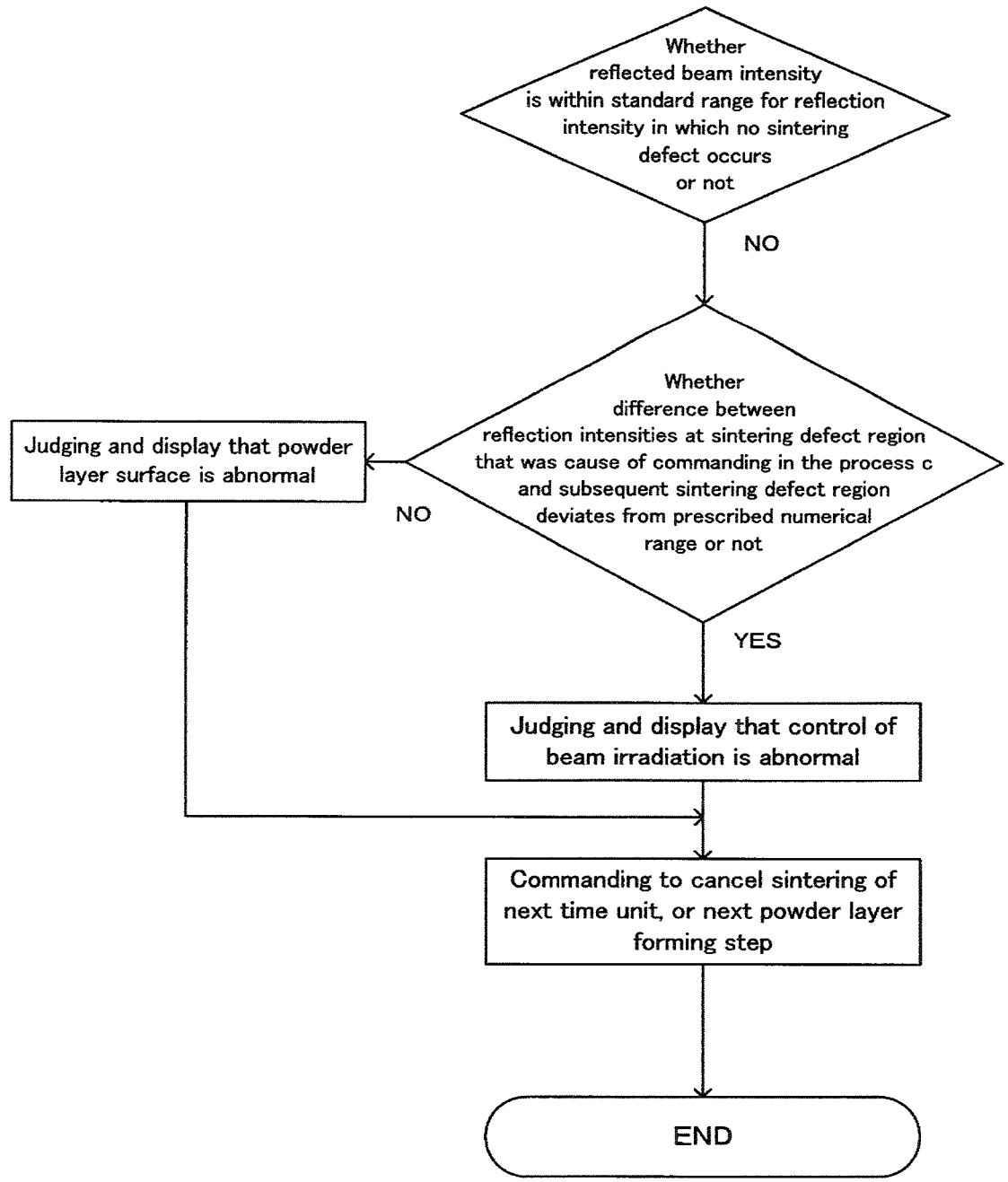

THREE-DIMENSIONAL SHAPING METHOD

TECHNICAL FIELD

The present invention relates to a method for producing a shaped body with a three-dimensional form, by lamination in which formation of a powder layer and sintering of the powder layer by a laser beam or electron beam are repeated.

BACKGROUND ART

In the aforementioned three-dimensional shaping method, it is currently impossible to completely prevent sintering defects, due to the following reasons:

A. A problem with the laser beam or electron beam control system may result in an excess or insufficiency of the supplied beam, forming a non-flat sintering surface with a generally regular uneven condition, compared to when each beam is supplied normally, B. Due to formation of the uneven condition of above A or infiltration of chips during formation of the powder layer supplied by the powder supply apparatus, squeegee movement is hampered and it becomes difficult to achieve a uniform flat surface, or melting with the previously sintered layer may be incomplete, causing abnormalities in the powder layer surface that result in a non-flat powder layer surface with an irregular uneven condition.

However, since in a three-dimensional shaping method, the laminating and sintering steps are repeated in a sealed apparatus, it is unavoidable that such sintering defects as mentioned in above A and B will be overlooked and only noticed after completion of all of the laminating steps and all of the sintering steps that have been repeated.

Detection of deterioration or defects generated in structures by irradiation and scattering of light is already publicly known, as disclosed in Patent Documents 1, 2 and 3, for example.

In addition, detection of the positions of cracks in structures such as ceramic bodies by the scattering of light is also publicly known, as disclosed in Patent Documents 4 and 5, for example.

However, the prior arts neither disclose nor suggest the appropriate use of technology relating to light reflection for three-dimensional shaping methods.

PRIOR ART DOCUMENTS

Patent Documents

Patent Document 1: Japanese Published Unexamined Patent Application No. 2008-241658
Patent Document 2: Japanese Published Unexamined Patent Application No. 2010-243375
Patent Document 3: Japanese Published Unexamined Patent Application No. 2013-083493
Patent Document 4: Japanese Published Unexamined Patent Application No. 2003-247943
Patent Document 5: Japanese Published Unexamined Patent Application No. 2004-093300

SUMMARY OF INVENTION

Technical Problem

In light of the background art described above, the present invention provides a three-dimensional shaping method that can prevent generation of defective three-dimensional shaped products due to inclusion of sintering defect regions, by rapidly detecting sintering defects in the powder layer forming step and sintering step.

Solution to Problem

In order to solve the aforementioned problems, the present invention has the following basic configurations.

(1) A three-dimensional shaping method that includes lamination comprising alternatively repeating a powder layer forming step and a sintering step in which the powder layer is sintered by irradiation of a moving laser beam or electron beam, wherein the following process is adopted during the sintering step.

a. Measuring the reflection intensity of the laser beam or electron beam irradiated during each sintering step, or irradiation of light other than the laser beam on the whole sintering region and the reflection intensity of that light, in each sintering step, b. commanding to continue sintering in the next time unit or the next powder layer forming step is given, when, in a time unit within the time necessary for each sintering step, it has been detected that the reflection intensity of the process a is within a standard range for reflection intensity in which no sintering defects are produced, c. commanding to cancel sintering in the next time unit or the next powder layer forming step is given under a judging that a sintering defect has occurred, when, in a time unit within the time necessary for each sintering step, it has been detected that the reflection intensity of the process a has deviated from the standard range for reflection intensity in which no sintering defects are produced, d. taking spectral images for the laser beam or electron beam, or reflected light other than the laser beam that has been reflected from the sintering region where the sintering defect has occurred causing commanding in the process c, and from the sintering region within the subsequent time unit, based on the intensity corresponding to each wavelength according to a spectral function, e. judging that the cause of the sintering defect resulted in commanding in the process c is a problem with the control system related to the laser beam or electron beam, when each spectral image in the process d is unchanged or changes only gradually, and judging that the cause of the sintering defect is a problem with the powder layer-formed surface, when each spectral image in the process d changes rapidly.

(2) A three-dimensional shaping method that includes lamination comprising alternatively repeating a powder layer forming step and a sintering step in which the powder layer is sintered by irradiation of a moving laser beam or electron beam, wherein the following process is adopted during the sintering step.

a. Measuring the reflection intensity of the laser beam or electron beam irradiated during each sintering step, or irradiation of light other than the laser beam on the whole sintering region and the reflection intensity of that light, in each sintering step, b. commanding to continue sintering in the next time unit or the next powder layer forming step is given, when, in a time unit within the time necessary for each sintering step, it has been detected that the reflection intensity of the process a is within a standard range for reflection intensity in which no sintering defects are produced, c. commanding to cancel sintering in the next time unit or the next powder layer forming step is given under a judging that a sintering defect has occurred, when, in a time unit within the time necessary for each sintering step, it has been detected that the reflection intensity of the process a has deviated from the standard range for reflection intensity in which no sintering defects are produced, f. recording the reflection intensities at the sintering region where the sintering defect that resulted in commanding in the process c, and at the sintering region within the subsequent time unit, g. judging that the cause of the sintering defect resulted in commanding in the process c is a problem with the control system related to the laser beam or electron beam, when each reflection intensity in the process f is unchanged or changes only gradually, and judging that the cause of the sintering defect is a problem with the powder layer-formed surface, when each reflection intensity in the process f changes rapidly.

Advantageous Effects of Invention

With the basic configurations (1) and (2), the sintering step in the next time unit, or the next powder layer forming step, can be canceled by detection of a sintering defect with commanding in the process c, making it possible to prevent unnecessary steps of further lamination and sintering after a sintering defect has occurred, and to thus detect sintering defect regions, and consequently avoid generation of defective three-dimensional shaped products.

Moreover, when the cause of a sintering defect has been identified and corrected, and the entire sintering region in which the sintering defect has occurred, or that entire region and the already laminated sintering regions, are removed by melting or softening, or all of the entire sintering regions are removed with a cutting tool, and a new laminating step and sintering step are repeated, it is possible to efficiently carry out production of a three-dimensional shaped product despite generation of the sintering defects.

BRIEF DESCRIPTION OF DRAWINGS

FIG. 1 is a pair of schematic diagrams showing an apparatus for carrying out the three-dimensional shaping method of the invention, (a) shows a case in which the reflection intensity of the laser beam or the electron beam used for sintering in each sintering step is measured according to basic configurations (1) and (2), and (b) shows a case in which, after irradiation of the whole sintering region in each sintering step with light other than a laser beam, the reflection intensity of that light is measured, according to basic configurations (1) and (2).

FIG. 2 is a flow chart representing the processes a, b and c of basic configurations (1) and (2).

FIG. 3 is a pair of spectral images showing the principle for elucidating the cause of sintering problems by spectrum analysis of reflected light, (a) shows the difference based on change in the spectral image due to a problem with control according to A under Background Art, and (b) shows the difference based on change in the spectral image due to a problem with the lamination surface according to B under Background Art.

Note that the dotted lines represent the spectral images at levels where a sintering defect has occurred that has resulted in commanding in the process c, while the solid lines represent the subsequent spectral images.

FIG. 4 is a flow chart relating to distinguishing between causes based on differences in the state of change as shown in FIG. 3.

FIG. 5 is a pair of graphs showing comparisons between transition of time units of reflection intensity in the case of a sintering defect resulting in commanding of the process c, and transition of time units of normal reflection intensity, (a) shows the state of change of reflection intensity having a problem with the control system according to A under Background Art, and (b) shows the state of change of reflection intensity having a problem with the lamination surface according to B under Background Art.

Note that the dotted lines represent the reflection intensities at levels where a sintering defect has occurred that has resulted in commanding in the process c, while the solid lines represent the subsequent reflection intensities.

FIG. 6 is a flow chart relating to distinguishing between causes based on differences in the state of change as shown in FIG. 5.

DESCRIPTION OF EMBODIMENTS

According to basic configurations (1) and (2), as shown in FIG. 1(a), the construction is the same as the prior art in requiring a table 2 that supports powder to be laminated and a sintered product from the powder in a container (vessel) 1, a powder supply device 3 for the container 1, a squeegee 4 used to flatten the provided powder, a laser beam or electron beam supply source 5 and a scanner device 6 capable of moving the beams, and a controller 10, but it also comprises a reflection intensity measuring apparatus 8 for the irradiated laser beam or electron beam, or as shown in FIG. 1(b), it comprises the same constituent elements as the prior art but also comprises a reflection intensity measuring apparatus not for reflection intensity of the irradiated laser beam or electron beam but rather for light rays irradiated onto the entire irradiation region from an irradiating light source 11 (note that, in FIG. 1(b), the reflected laser beam or electron beam 7 is not shown).

The light source other than that for the laser beam may be not only visible light rays but also light rays other than visible light rays, such as ultraviolet rays, infrared rays or far-infrared rays.

Measurement of the reflection intensity in the process a of basic configurations (1) and (2) assumes that, in each laminating step, the reflection intensity of the reflective beam 7 or reflected light 9 can be measured over the entire sintering region, while the sintering region changes in order.

Based on this assumption, when reflection intensity of light other than a laser beam is to be measured, it is essential for the light irradiation to be performed over the entire sintering region.

When the reflection intensity of the process a is of the reflective beam 7 of a laser beam or reflected light 9, the measurement is made with a photoelectric conversion device, and when it is the reflective beam 7 of an electron beam, the measurement is made by electromagnetic induction.

The intensity for measurement by photoelectric conversion may use either luminosity or illuminance as standard.

For measurement by electromagnetic induction, on the other hand, a voltage value or current value based on electromagnetic induction is used as standard.

In order to evaluate the reflection intensity in the process b and c of basic configurations (1) and (2), the time unit is set to be within each sintering step, the reason being for more efficient evaluation, since it is very cumbersome and also meaningless to perform evaluation for each measurement.

The time unit also includes cases where it is the time of each sintering step, but it may also be selected as a time that is ⅒ to ½ of that time.

The processes of the processes a, b and c of basic configurations (1) and (2) are shown in the flow chart of FIG. 2, prescribing that when the reflection intensity is such that no sintering defect has occurred and is within the reflection intensity range previously set as the standard, then commanding is given to continue sintering for the next time unit, or the next powder layer forming step, as described in the process b, but when the reflection intensity is such that a sintering defect has occurred and is outside of the reflection intensity range previously set as the standard, i.e. it is either larger than or smaller than the standard range, then sintering for the next time unit, or the next powder layer forming step, is canceled.

The standard range in which it is assumed that no sintering defect has occurred is set beforehand, by data in numerical ranges serving as the standard of luminosity or illuminance (for the reflective beam 7 of a laser beam or reflected light 9) and the voltage value or current value (for the reflective beam 7 of an electron beam) when it has been confirmed that no sintering defects are produced, for each sintering step.

The data for the standard numerical ranges are set in the following manner.

In a three-dimensional shaping method, an appropriate laser beam or electron beam intensity range is defined according to the type of object to be shaped.

Thus, the standard for avoiding an uneven condition caused by an abnormal beam supply according to A under Background Art can be pre-established by successively increasing and decreasing the normal supplied amount of a laser beam or electron beam from the normal state, for the prescribed time unit and at the prescribed measuring position for each type of object to be shaped, with the supply carried out so as to reach the limits for the appropriate uneven condition, measuring the luminosity or illuminance and the voltage value or current value at the limit levels, and determining the maximum just before the supply amount reaches an excess level and the minimum just before it reaches an insufficient level.

On the other hand, most types of three-dimensional shaping objects are common with each other according to having a normal, i.e. flat powder surface.

According to the consideration for such a common state, the standard for avoiding an abnormal uneven condition according to B under Background Art can be pre-established, through separate experiments in which by defining a condition of poor movement of the squeegee 4 that can interfere with obtaining a flat surface, which is caused by infiltration of chips, or an incomplete molten state due to insufficient sintering, during the prescribed time unit or at the prescribed measuring position, the degree of irregularity and the degree of incompleteness are gradually reduced, by confirming the border levels for a normal flat condition and an abnormal uneven condition, measuring the luminosity or illuminance and the voltage value or current value at the confirmed levels, and determining the minimum just before an irregular condition is reached.

The basis for selecting cancellation as in the process c when the reflection intensity as measured according to the process a deviates from the aforementioned standard range, is as follows.

When a problem relating to control of the laser beam or electron beam according to A above has occurred, if the beams exceed the proper amount that does not generate sintering defects, then the reflection intensity also exceeds the proper range, or if the beams are insufficient, then the reflection intensity must be less than the numerical range.

In either case, whether the beams exceed the proper numerical range or are insufficient, this means that so long as an essentially regular uneven condition is formed on the sintering surface compared to normal sintering, if the reflection intensity deviates from the prescribed numerical range, then it was appropriate to select the cancellation in the process c, in response to the generation of a sintering defect.

On the other hand, in the case of a problem with the powder layer surface according to B above, the irradiated laser beam or electron beam undergoes diffuse reflection on the problematic surface and the reflection intensity measured with the reflection intensity measuring apparatus 8 shown in FIGS. 1(*a*) and (*b*) changes to a smaller value compared to a normal surface in which no sintering defect has been produced, and it is concluded that the selection in the process c was appropriate.

Moreover, a sintering defect that resulted in commanding in the process c is due to causes A and B in most cases.

Consequently, it is highly appropriate to issue commanding cancellation for the process c based on the standard range for reflection intensity when no sintering defects occur, and the commanding prevention for the meaningless and futile steps of further repeated lamination and sintering, so that it becomes possible to avoid production of a three-dimensional shaped product with defects.

The standard range for reflection intensity in which no sintering defects occur will differ depending on the material of the object to be shaped, the radiation intensity of each beam and the performance of the measuring apparatus that measures the reflective beam 7 or reflected light 9, and it is impossible to specify the numerical range for the standard range in a general manner.

It is therefore indispensable to consider each of the factors and to specify the numerical range based on accumulated experience.

When a sintering defect that results in commanding of the process c has occurred, the cause thereof is usually diagnosed.

In order to diagnose the cause of the sintering defect, the following process may be adopted according to basic configuration (1).

d. Taking spectral images for the laser beam or electron beam, or reflected light other than the laser beam that has been reflected from the sintering region where the sintering defect has occurred causing commanding in the process c, and from the sintering region within the subsequent time unit, based on the intensity corresponding to each wavelength according to a spectral function, e. judging that the cause of the sintering defect resulted in commanding in the process c is a problem with the control system related to the laser beam or electron beam, when each spectral image in the process d is unchanged or changes only gradually, and judging that the cause of the sintering defect is a problem with the powder layer-formed surface, when each spectral image in the process d changes rapidly.

The judging process e based on the spectral image of the process d derives from the empirical rule that a change that has occurred in the state of reflection of the laser beam or light that results in a change in reflection intensity must necessarily lead to a change in the spectral image based on the reflection intensity.

The judging process e is based on the following.

When A is a sintering defect caused by a problem relating to the control system, the abnormal state of irradiation of the laser beam or electron beam continues and the uneven shape produced by the irradiation is essentially regular, and therefore the condition of the reflected laser beam 7 and reflected light 9 will exhibit either no change (also including no change in approximate terms, or essentially no change), or only a small change, with a different sintering region.

Consequently, the spectral image for the subsequent sintering region will exhibit either no change or only a small change compared to the spectral image at the region of the sintering defect that resulted in commanding process c, as according to the process d.

As a result, little difference is seen between both spectral images, as shown in FIG. 3(a).

In contrast, when a problem with the powder layer surface is the cause of the sintering defect, as according to B, the region of the sintering defect is not necessarily continuous, and the uneven condition of the powder layer is irregular.

Consequently, when, after a sintering region with the sintering defect that resulted in commanding in the process c, the sintering defect remains at the sintering region at which the reflection intensity was measured, the irregular uneven condition clearly differs from the uneven condition of the original sintering defect, whereas if the sintering defect has already disappeared at the sintering region where the reflection intensity is subsequently measured, the condition of the reflective beam 7 or reflected light 9 will naturally be clearly different.

Therefore, the spectral image based on the reflection intensity at the subsequent sintering region changes rapidly from the spectral image based on the reflection intensity of the sintering defect that resulted in commanding process c.

As a result, as shown in FIG. 3(b), spectral images are obtained that clearly differ between the former and the latter.

Thus, due to the distinct difference in transition of the reflection state between the case of A and the case of B, the change in the spectral image also differs, and the judging process e can be made.

The judgment according to e can be made visually based on the state of change between the spectral image for the sintering defect that resulted in commanding process c and the spectral image in the subsequent sintering region.

However, a prescribed numerical control is necessary if the judgment is to be automated and displayed.

Thus, an embodiment may be adopted as shown in the flow chart of FIG. 4, wherein there are selected among the spectral images of the process d, the sintering region in which the sintering defect that resulted in commanding process c has occurred, and one sintering region among the subsequent sintering regions, and if the peak value difference for a specific frequency in both spectral images is within a prescribed numerical range previously set as a standard, then it is judged and displayed that the cause of the sintering defect that resulted in commanding process c is a problem with the control system relating to the laser beam or electron beam, as according to A above, while if the difference deviates from the prescribed numerical range previously set as a standard, then it is judged and displayed that the cause of the sintering defect is a problem with the powder layer surface as according to B above.

The previous setting of the prescribed numerical range as a standard can be accomplished by taking spectral images in advance for each sintering step at multiple positions during each time unit when the problem with the control system relating to the laser beam or electron beam as according to A is at its maximum state, creating the data for the state of peak value change for a specific frequency in advance, and then for the actual judgment, using the numerical value for the peak value ratio or difference between the two sintering regions.

This numerical value will also differ depending on the material of the object to be shaped, the radiation intensity of each beam and the performance of the measuring apparatus that measures the reflective beam 7 or reflected light 9, and it is impossible to specify the numerical range for the standard range in a general manner.

In order to diagnose the cause of the sintering defect, the following process may be adopted according to basic configuration (2).

f. Recording the reflection intensities at the sintering region where the sintering defect that resulted in commanding in the process c, and at the sintering region within the subsequent time unit, g. judging that the cause of the sintering defect resulted in commanding in the process c is a problem with the control system related to the laser beam or electron beam, when each reflection intensity in the process f is unchanged or changes only gradually, and judging that the cause of the sintering defect is a problem with the powder layer-formed surface, when each reflection intensity in the process f changes rapidly.

The following is the reasoning under which a judgment according to the process g can be made by recording the reflection intensity as in the process f.

As explained for the imaging in the process d and the judging process e, when the cause is A, the reflective beam 7 or the reflected light 9 is either unchanged (also including unchanged in approximate terms, or essentially unchanged), or only slightly changed.

As a result, the reflection intensity also exhibits either no change or only a small change, as shown in FIG. 5(a).

In contrast, when the cause is B, the uneven condition of the powder layer surface changes rapidly, and as a result the reflection intensity at the sintering region that was the cause of commanding in the process c and the reflection intensity at the subsequent sintering region change rapidly as shown in FIG. 5(b).

Thus, the case of A and the case of B can be judged according to the process g based on the clear difference in the transition of the change in reflection intensity.

The judging process g can be made visually based on the state of change between the reflection intensity for the sintering defect that resulted in commanding in the process c and the reflection intensity in the subsequent sintering region.

However, a prescribed numerical control is necessary in order for the judgment to be automated and displayed.

Thus, an embodiment may be adopted as shown in the flowchart of FIG. 6, such that, among the reflection intensities according to the process f, if the difference in the reflection intensities of the sintering region at which a sintering defect occurred resulting in commanding process c and at least one subsequent sintering region is within a prescribed numerical range previously set as a standard, then it is judged and displayed that the cause of the sintering defect that resulted in commanding in the process c is a problem with the control system relating to the laser beam or electron beam, while if the difference deviates from the prescribed numerical range previously set as a standard, then it is judged and displayed that the cause of the sintering defect is a problem with the powder layer surface.

The previous setting of the prescribed numerical range as a standard can be accomplished by creating the data for the transition of the reflection intensity for the time unit of each sintering step, when the problem with the control system relating to the laser beam or electron beam as according to A is at its maximum state, and then for the actual judgment, using the numerical value standard for the ratio or difference relating to the reflection intensities for the two sintering regions.

This numerical value will also differ depending on the material of the object to be shaped, the radiation intensity of each beam and the performance of the measuring apparatus that measures the reflective beam 7 or reflected light 9, such that it is impossible to specify the numerical range for the standard range in a general manner.

A description will be given as below according to Examples.

Example 1

For Example 1, the entire sintering region including the sintering position in which the cause of a sintering defect has been corrected and commanding in the process c has been carried out, or that entire sintering region and the entire sintering region that has already been laminated below that region, is melted or softened by a laser beam or electron beam, and then only the portion of the thickness of the melted or softened region, or the portion of the thickness of the sintered and laminated sintering region is removed, or alternatively the entireties of each of those sintering regions are removed with a cutting tool, and the laminating step and sintering step are repeated from the freshly removed regions.

As an explanation in terms of the technical gist of Example 1, even though the position of the sintering defect that was the cause of commanding in the process c, and its proximity, has been melted and removed with the laser beam or electron beam, new lamination and sintering in that region requires image analysis of the melted and removed region and new lamination and sintering based on that analysis.

However, it is highly complicated and inefficient to perform such image analysis, and to carry out the powder layer forming step and sintering step in a local region based on the image analysis.

Therefore, in Example 1, the entire sintering region including the position in which the sintering defect has been produced by each beam, or not only that entire sintering region, but also the entire sintering region that has already been formed, are melted, and then based on precise dimensional measurement, the portion of the thickness of the sintering region is removed, or alternatively the portion of the thickness of that entire region and the entire sintering region that has already been formed below it, are removed, then continuously carrying out the new lamination and sintering.

In the case of Example 1, it is possible to effectively utilize the sintered layer that has already been formed, except for the region that is melted and removed in this manner, so that a three-dimensional shaped product without defects can be produced even when a sintering defect has been detected.

Example 2

For Example 2, a light signal and/or an audio signal indicate the presence of a sintering problem during commanding in the process c.

This configuration allows sintering defects to be rapidly dealt with.

Specifically, if different color light signals are selected or different audio signals are selected depending on whether the cause of the sintering defect is A or B, it will be possible to rapidly determine and deal with the cause of the sintering defect.

INDUSTRIAL APPLICABILITY

As explained above, in the present invention, sintering defects may be rapidly detected, and three-dimensional shaped products may be produced efficiently.

On the other hand, in the present invention, production of three-dimensional shaped products with defects may be prevented, and so the invention is useful in all three-dimensional shaping methods.

REFERENCE SIGNS LIST

1: Container (vessel)
2: Table
3: Powder supply device
4: Squeegee
5: Laser beam or electron beam supply source
6: Scanner
7: Reflective beam
8: Reflective beam measuring apparatus
81: Reflective beam detector
82: Reflective beam measuring instrument
9: Reflected light
10: Controller
11: Irradiating light source

The invention claimed is:

1. A three-dimensional shaping method that includes lamination comprising the steps of:
alternatively repeating a powder layer forming step and a sintering step in which the powder layer is sintered by irradiation of one of a moving laser beam and an electron beam, and wherein the following step is adopted during the sintering step:
a. measuring a reflection intensity of one of:
the one of the laser beam and the electron beam irradiated during each sintering step, and
irradiation of light other than the beam on an entire sintering region and a reflection intensity of that light, in each sintering step,
b. commanding to continue sintering in one of:
a next time unit and
when a next powder layer forming step is given, when, in a time unit within a time necessary for each sintering step, it has been detected that the reflection intensity of the step a is within a standard range for reflection intensity in which no sintering defects are produced,
c. commanding to cancel sintering in one of:
the next time unit and
when the next powder layer forming step is given under a judging that a sintering defect has occurred, when, in the time unit within the time necessary for each sintering step, it has been detected that the reflection intensity of the step a has deviated from the standard range for reflection intensity in which no sintering defects are produced, d. taking spectral images for one of:
  the beam, and
  reflected light other than the beam that has been reflected from a sintering region where the sintering defect has occurred causing commanding in the step c, and from a sintering region within a subsequent time unit, based on an intensity corresponding to each wavelength according to a spectral function,
e. judging that a cause of the sintering defect resulted in commanding in the step c is a problem with a control system related to the beam, when each wavelength denoting the sintering defect does not change in each spectral image formed in the step d,
  and
f. judging that the cause of the sintering defect is a problem with the powder layer-formed surface, when each wavelength denoting the sintering defect changes in each spectral image formed in the step d.

2. A three-dimensional shaping method according to claim 1, further comprising the steps of:
  selecting from among the spectral images of the step d, the sintering region in which the sintering defect that resulted in commanding in the step c has occurred, and one sintering region among subsequent sintering regions, and
  if a peak value difference for a specific frequency in both spectral images is within a prescribed numerical range previously set as a standard, judging and displaying that the cause of the sintering defect that resulted in commanding in the step c is the problem with the control system relating to the beam, and
  if the peak value difference deviates from the prescribed numerical range previously set as the standard, judging and displaying that the cause of the sintering defect is the problem with the powder layer-formed surface.

3. A three-dimensional shaping method that includes lamination comprising the steps of:
  alternatively repeating a powder layer forming step and a sintering step in which the powder layer is sintered by irradiation of one of a moving laser beam and an electron beam, and wherein the following step is adopted during the sintering step:
  a. measuring a reflection intensity of one of:
    the one of the laser beam and the electron beam irradiated during each sintering step, and
    irradiation of light other than the beam on an entire sintering region and a reflection intensity of that light, in each sintering step,
  b. commanding to continue sintering in one of:
    a next time unit and
    when a next powder layer forming step is given, when, in a time unit within a time necessary for each sintering step, it has been detected that the reflection intensity of the step a is within a standard range for reflection intensity in which no sintering defects are produced,
  c. commanding to cancel sintering in one of:
    the next time unit and
    when the next powder layer forming step is given under a judging that a sintering defect has occurred, when, in the time unit within the time necessary for each sintering step, it has been detected that the reflection intensity of the step a has deviated from the standard range for reflection intensity in which no sintering defects are produced,
  d. recording the reflection intensities at the sintering region where the sintering defect that resulted in commanding in the step c has occurred, and at a sintering region within a subsequent time unit,
  e. judging that a cause of the sintering defect resulted in commanding in the step c is a problem with a control system related to the beam, when after a one time sudden change of the light intensity occurs, the sudden change of the light intensity does not occur on each reflection intensity in the step d,
    and
  f. judging that the cause of the sintering defect is a problem with the powder layer-formed surface, when after a plurality of times of change of the light intensity occurs, the plurality of times of change of the light intensity does not occur on each reflection intensity in the step d.

4. A three-dimensional shaping method according to claim 3, wherein, among the reflection intensities according to the step d, comprising the steps of:
  if a difference in the reflection intensities of the sintering region at which a sintering defect occurred resulting in commanding in the step c and at least one subsequent sintering region is within a prescribed numerical range previously set as a standard, judging and displaying that the cause of the sintering defect that resulted in commanding in the step c is the problem with the control system relating to the beam, and
  if the difference deviates from the prescribed numerical range previously set as the standard, judging and displaying that the cause of the sintering defect is the problem with the powder layer-formed surface.

5. A three-dimensional shaping method according to claim 1, further comprising the steps of:
  one of melting and softening by one of the laser beam and the electron beam one of:
    the entire sintering region including a sintering position in which the cause of the sintering defect has been corrected and commanding in the step c has been carried out, and
    that entire sintering region and the entire sintering region that has already been laminated below that entire sintering region, by one of the laser beam and the electron beam, and
  then one of:
    removing one of:
      only a portion of the thickness of the melted or softened region, and
      the portion of the thickness of the sintered and laminated sintering region, and
    removing the entireties of each of those sintering regions
  with a cutting tool, and
    repeating the laminating step and sintering step from the freshly removed regions.

6. A three-dimensional shaping method according to claim 1, further comprising the step of, during commanding in the step c, indicating the sintering problem by at least one of a light signal and an audio signal.

7. A three-dimensional shaping method according to claim 2, further comprising the step of selecting a light signal from different colors for the cause of the sintering defect.

8. A three-dimensional shaping method according to claim 2, further comprising the step of selecting an audio signal from different audio signals, with a sound wave which is discriminated by a shape of the wave and a frequency of the wave for the cause of the sintering defect.

9. A three-dimensional shaping method according to claim 2, further comprising the steps of:
one of melting and softening by one of the laser beam and the electron beam one of:
the entire sintering region including a sintering position in which the cause of the sintering defect has been corrected and commanding in the step c has been carried out, and
that entire sintering region and the entire sintering region that has already been laminated below that entire sintering region, by one of the laser beam and the electron beam, and
then one of:
removing one of:
only a portion of the thickness of the melted or softened region, and
the portion of the thickness of the sintered and laminated sintering region, and
removing the entireties of each of those sintering regions
with a cutting tool, and
repeating the laminating step and sintering step from the freshly removed regions.

10. A three-dimensional shaping method according to claim 3, further comprising the steps of:
one of melting and softening by one of the laser beam and the electron beam one of:
the entire sintering region including a sintering position in which the cause of the sintering defect has been corrected and commanding in the step c has been carried out, and
that entire sintering region and the entire sintering region that has already been laminated below that entire sintering region, by one of the laser beam and the electron beam, and
then one of:
removing one of:
only a portion of the thickness of the melted or softened region, and
the portion of the thickness of the sintered and laminated sintering region, and
removing the entireties of each of those sintering regions
with a cutting tool, and
repeating the laminating step and sintering step from the freshly removed regions.

11. A three-dimensional shaping method according to claim 4, further comprising the steps of:
one of melting and softening by one of the laser beam and the electron beam one of:
the entire sintering region including a sintering position in which the cause of the sintering defect has been corrected and commanding in the step c has been carried out, and
that entire sintering region and the entire sintering region that has already been laminated below that entire sintering region, by one of the laser beam and the electron beam, and
then one of:
removing one of:
only a portion of the thickness of the melted or softened region, and
the portion of the thickness of the sintered and laminated sintering region, and
removing the entireties of each of those sintering regions
with a cutting tool, and
repeating the laminating step and sintering step from the freshly removed regions.

12. A three-dimensional shaping method according to claim 3, further comprising the step of, during commanding in the step c, indicating the sintering problem by at least one of a light signal and an audio signal.

13. A three-dimensional shaping method according to claim 4, further comprising the step of selecting a light signal from different colors for the cause of the sintering defect.

14. A three-dimensional shaping method according to claim 6, further comprising the step of selecting a light signal from different colors for the cause of the sintering defect.

15. A three-dimensional shaping method according to claim 4, further comprising the step of selecting an audio signal from different audio signals, with a sound wave which is discriminated by a shape of the wave and a frequency of the wave for the cause of the sintering defect.

16. A three-dimensional shaping method according to claim 6, further comprising the step of selecting an audio signal from different audio signals, with a sound wave which is discriminated by a shape of the wave and a frequency of the wave for the cause of the sintering defect.

* * * * *